J. P. EASTMAN.
HOSE COUPLING.
APPLICATION FILED AUG. 1, 1919.

1,428,949.

Patented Sept. 12, 1922.

Inventor:
Joseph P. Eastman

UNITED STATES PATENT OFFICE.

JOSEPH P. EASTMAN, OF MANITOWOC, WISCONSIN, ASSIGNOR TO EASTMAN MANUFACTURING COMPANY, OF MANITOWOC, WISCONSIN, A CORPORATION.

HOSE COUPLING.

Application filed August 1, 1919. Serial No. 314,650.

*To all whom it may concern:*

Be it known that I, JOSEPH P. EASTMAN, a citizen of the United States, and resident of Manitowoc, in the county of Manitowoc and State of Wisconsin, have invented certain new and useful Improvements in Hose Coupling; and I do hereby declare that the following is a full, clear, and exact description thereof.

My invention refers to new and useful improvements in means for connecting metallic couplings, unions and the like to non-metallic and preferably flexible tubing. Heretofore it has been more or less difficult to procure a fluid tight connection between metallic couplings and the like and flexible rubber or composition tubing, and when such was obtained the tubing, being more or less mutilated, quickly wore out or "rotted." It is therefore the principal object of this invention to provide an arrangement whereby such a connection may be carried out in an efficient manner.

It is also an object to provide means for connecting the non-metallic and metallic elements together without the aid of any special or complicated tools.

Figure 1:
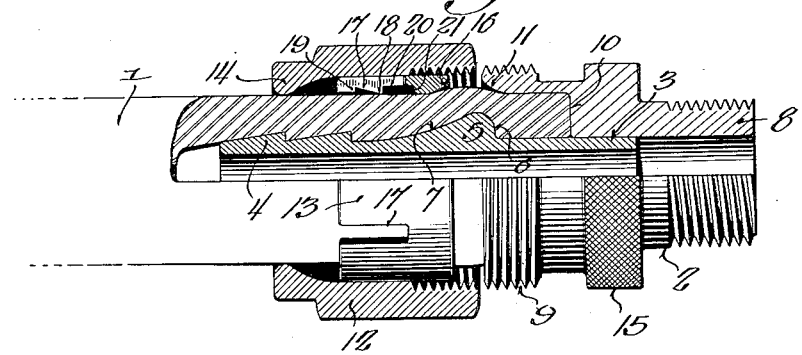
Figure 2:
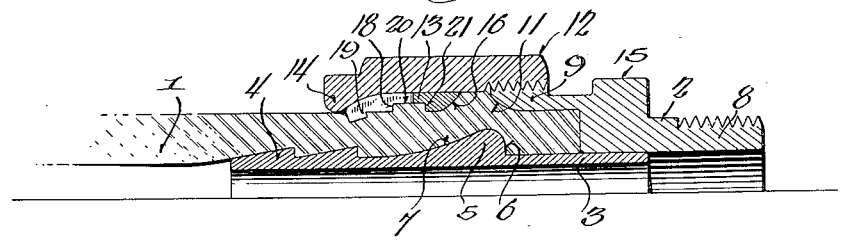

With these general objects in view the invention resides in the novel features of construction, combination and arrangement of parts which will be hereinafter more particularly described and claimed and shown in the accompanying drawing in which, Figure 1 represents a part elevational and part sectional view of a flexible tube having a metallic coupling disposed thereon, the several parts being arranged in juxtaposition ready to be assembled, and Figure 2 is a longitudinal sectional view through a coupling secured to a flexible tube in accordance with the invention.

Although in the accompanying drawing the invention is embodied in a coupling, it is obvious that the primary features thereof may be modified for use in unions and the like and that various changes may be made in the form and proportion of the several parts in which said features are incorporated without departing from the principles or sacrificing any of the advantages of the invention.

Referring more particularly to the drawing, it will be noted that the numeral 1 denotes one end portion of a section of flexible tubing formed of rubber or composition material. In preparing this end of the tubing for a coupling member 2, a metallic reinforcing sleeve 3 is inserted in the bore of the former, and the barbs 4 which are formed on the inner end retain the same therein. The outer end of the sleeve preferably projects beyond the adjacent end of the tubing, and disposed intermediate this projecting end and the series of barbs 4 is an annular rounded ridge 5, the outer side of which forms a substantially right angular shoulder with the contiguous surface of the sleeve as at 6. The other portion of the ridge, however, slopes gradually toward the adjacent barb 4 as indicated at 7; such an arrangement allows the sleeve to be inserted in the bore of the tube relatively easily but renders removal quite difficult. From the figures of the drawing it will be noticed that while the barbs 4 bite into the material of the tube, the ridge 5 merely forced the same outwardly in an annular bulge.

The coupling member to be used in the illustrated embodiment of the invention includes an externally threaded nipple 8, having a bore substantially the diameter of the bore of the tube 1 so as to receive the projecting end of the sleeve 3, and an externally threaded collar 9 of substantially the same internal diameter as the external diameter of said tube over the end of which it is adapted to be disposed. The shoulder 10 formed by the difference in diameters of the bores of the two different parts of the coupling member abuts the end of the tube as shown. The free edge of the inner surface of the collar 9 is preferably slightly outwardly flared as at 11.

The coupling 2 is secured to the end of the tube 1 by means of a clamping and retaining ring 12 and a bendable compression band 13. These members are slipped over the end of the tube before the coupling is disposed thereon, the normal inner diameter of the band 13 being substantially the same as the outer diameter of said tube while the inner diameter of the major portion of the ring 12 is greater than that of said tube and similar to the outer diameter of the collar 9. Thus the band is easily located within the ring 12, it being of considerably less width than the latter.

The outer portion of the ring 12 is internally screw threaded for engagement with the threads of the collar 9, and its opposite end is formed with an annular inwardly extending inclined shoulder 14, the inner diameter of this part of the ring being substantially the same as the external diameter of the tube. The exterior of the clamping and retaining ring is preferably hexagonal or otherwise polygonal in cross section to permit the effective engagement of a wrench of the like therewith. Similarly the coupling 2 is provided with a knurled enlargement 15.

The above referred to bendable compression band has one inner annular edge outwardly flared or beveled as at 16, this edge being preferably disposed outwardly or toward the coupling 2; the opposite edge portion has a plurality of transversely extending kerfs 17, whereby this part of the band may be readily bent deeply into the exterior surface of the tube 1. To make this engagement more effective the band is provided with an inner annular barb 18 and an inner annular shoulder 19 located between said barb and the kerfed edge. Also the central portion of the band has an inner annular channel 20 which forms a second shoulder 21.

In assembling the several parts of the invention and the elements with which it is associated, the same are first arranged as shown in Figure 1. That is to say the compression band 13 is slipped over the end of the tube 1 together with the clamping and retaining ring 12 after which the sleeve 3 is inserted causing the annular bulge in the tube 1 as above mentioned. After the coupling is engaged with the end of the tube and the sleeve 3, the clamping and retaining ring 12 is moved toward the coupling 2 until the screw threads therein engage with those of the collar 9. As said ring is gradually threaded on the collar, the shoulder 14 of the former will be brought into engagement with the kerfed portion of the band 13 thereby bending such portion inwardly and compressing the material of the tube and urging it toward the coupling. In this way said annular bulge is accentuated and forced into the space between the beveled ends 11 and 16 of the collar 9 and band 13 respectively and against the inner surface of the ring 12 exposed therebetween. Likewise said material of the tube fills the annular channel 20 and the other crevices in the inner surface of said band as most clearly shown in Figure 2.

As a result of this arrangement the ridge 5 of the sleeve 3 co-operates with the movable portions of the invention to effectively secure the coupling 2, to the tube. Inasmuch as the bendable portions of the band 13 are gradually forced into the tube, the surface of the latter is not broken or otherwise mutilated so that the same will not be weakened. After the inclined shoulder 14 of the ring 12 bends the band and urges the material of the tube into the configuration shown in Figure 2, the same might become loosened or unscrewed slightly without causing any leakage or other detrimental action.

I claim:

1. The combination with a flexible element, of a sleeve disposed therein, said sleeve having an outwardly projecting ridge to bulge out the outer surface of the element and having one end extending outwardly beyond the end of the element, a coupling member disposed on said sleeve, and extending over the end of the element and having an annular shoulder abutting the end of said element, a bendable compression band on said element on the other side of the bulge from said coupling member, one end portion of said band having a plurality of kerfs, and a clamping member disposed around the element and over the band, means for threadedly engaging said clamping member with the coupling member, said clamping member having an inclined shoulder for engaging the compression band to bend the same into the tubular element when said clamping element is moved toward the coupling member, whereby said shoulder produces endwise compression on the end of the flexible element and forces the same into firm contact with the sleeve and coupling member.

2. The combination with a tubular flexible element, of a sleeve disposed therein, said sleeve having an outwardly projecting ridge to bulge out the outer surface of the element, a coupling member disposed on and closely fitting the sleeve, and having an annular shoulder abutting the end of said element, the coupling member being extended beyond said shoulder to fit around the end portion of the element at one side of the bulge, a bendable compression band disposed around said element on the opposite side of said bulge, and having barbs for engagement with the flexible element, and a clamping member disposed around said band, means for threadedly engaging said clamping member with the coupling member, said coupling member having an inclined shoulder for bending the compression band to cause said barbs to engage the flexible element when the clamping member is moved toward the coupling member, whereby the pressure between said shoulder and clamping member will serve to thicken the end portion of the tubular member to cause the same to tightly engage the coupling member and sleeve.

In testimony that I claim the foregoing I have hereunto set my hand at Milwaukee, in the county of Milwaukee and State of Wisconsin.

JOSEPH P. EASTMAN.